Oct. 15, 1929.  J. DROST  1,732,002

CALF DELIVERY APPARATUS

Filed Dec. 10, 1928

Patented Oct. 15, 1929

1,732,002

UNITED STATES PATENT OFFICE

JOHN DROST, OF REESEVILLE, WISCONSIN

CALF-DELIVERY APPARATUS

Application filed December 10, 1928. Serial No. 325,084.

My invention refers to animal delivery apparatus, and it has for its object to provide a simple, economical, and effective device of this general character, whereby a trough element having associated, independently adjustable legs can be positioned conveniently for the work required.

With the above object in view, the invention consists in certain peculiarities of construction and combination of parts as will be fully set forth hereinafter with reference to the accompanying drawings and subsequently claimed.

Figure 1:
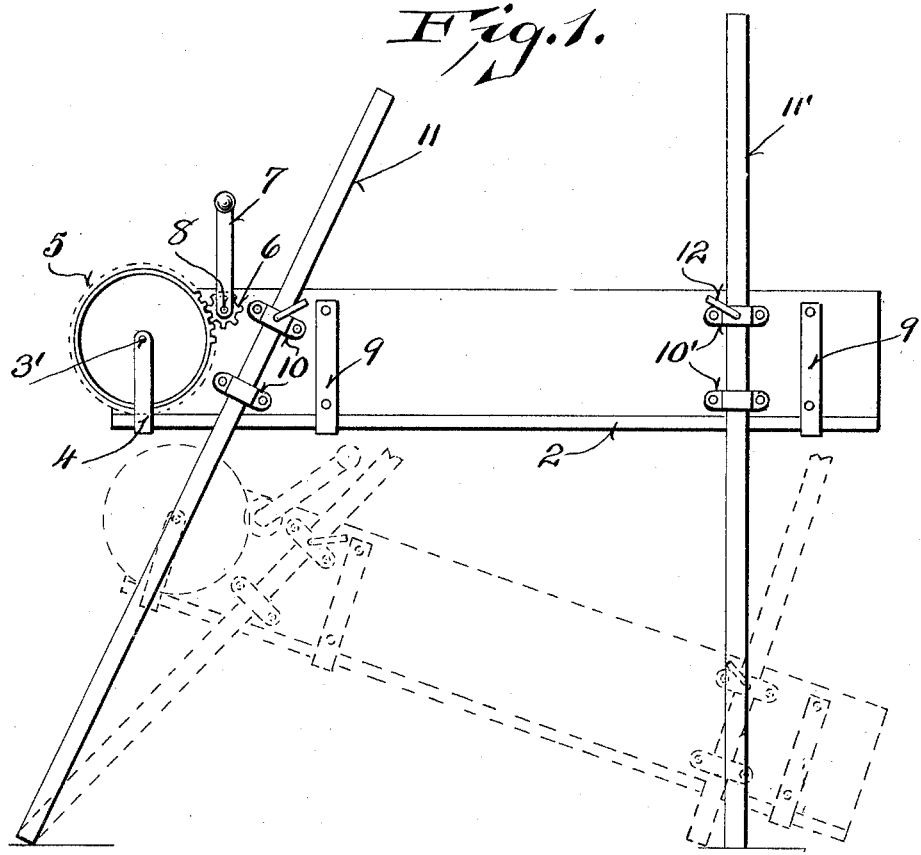

In the drawings, Figure 1 represents a side elevation of an animal delivery apparatus embodying the features of my invention, the same being shown in a predetermined adjusted position by dotted lines.

Figure 2:
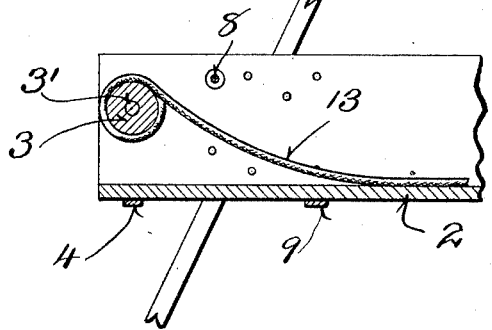
Figure 3:
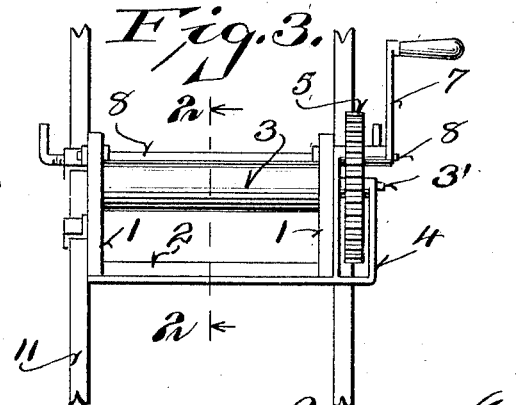
Figure 3:

Figure 2 is a fragmentary sectional elevation, the section being indicated by the line 2—2 of Figure 3; and Figure 3 is a front elevation of the trough with the leg elements broken away.

Referring by character to the drawing, 1 represents the side wall, and 2 represents the bottom of an open ended trough. Mounted in suitable bearings at the front end of the trough is a roller or windlass 3. The shaft 3' which extends through one of the trough side walls is shouldered at its end in a bracket 4 which is secured to the trough. Also, rigidly mounted on the shaft 3' between the bracket and side wall of the trough is a gear wheel 5, which gear wheel is in mesh with a pinion 6.

The pinion 6 has an integral crank arm 7. The pinion is loosely mounted on one end of a tie rod 8 which passes through the walls of the trough and serves as a brace to hold the same rigid.

The side walls are further braced to the bottom by strap irons 9 at the front and rear ends thereof. Secured to the side walls of the trough 1 are companion pairs of clips 10 and 10', respectively. These clips serve to receive pairs of adjustable supporting legs 11 and 11', respectively. The front set of legs 11 are positioned obliquely, whereby the ground engaging ends are positioned slightly in advance of the front end of the trough to thus support the same more securely, irrespective of the trough's position.

The upper clips of each set are provided with a locking lever 12 which levers are adapted to impinge against the legs and thus hold them in their adjusted positions.

The windlass has secured thereto a flexible runner 13, the free end of which runner is adapted to be fastened to the animal to be delivered, whereby it can be more readily manipulated in such delivery.

From the foregoing description, it will be observed that the device is particularly adapted for delivering calves, and in the event that the cow is in a thrown position, the trough can be quickly and positively adjusted at the proper angle and close to the ground, as indicated in dotted lines in Figure 1.

This adjustment is obtained by manipulation of the legs, and furthermore the trough can be adjusted upon an even plane, irrespective of irregularities in the ground, due to the fact that all of the legs are independently variable with reference to the trough. After such adjustment, the legs are securely locked by manipulating the levers 12, and in delivering the calf after the runner or rope is attached thereto, the windlass is manually operated to wind up the runner, and incidentally draw the calf gently into the trough without injury thereto.

I claim:

An animal delivery apparatus comprising an open ended trough, pairs of clips secured to the side walls of the trough at the front and rear ends thereof, legs adjustable therein, locking levers in threaded engagement with one end of each set, whereby all of the legs can be independently adjusted and locked to align and support the trough in a predetermined direct position, a winding drum mounted in the front end of said trough, crank actuated gear wheels for the windlass, and a runner carried by the windlass adapted to be attached to the animal for aiding in delivering the same and moving it into said trough.

In testimony that I claim the foregoing I have hereunto set my hand at Reeseville, in the county of Dodge and State of Wisconsin.

JOHN DROST.